(12) United States Patent
Shimura (10) Patent No.: US 7,817,023 B2
(45) Date of Patent: Oct. 19, 2010

(54) WHEEL INFORMATION ACQUIRING SYSTEM

(75) Inventor: Kazuhiro Shimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 574 days.

(21) Appl. No.: 11/720,178

(22) PCT Filed: Dec. 15, 2005

(86) PCT No.: PCT/JP2005/023026

§ 371 (c)(1),
(2), (4) Date: May 24, 2007

(87) PCT Pub. No.: WO2006/064866

PCT Pub. Date: Jun. 22, 2006

(65) Prior Publication Data

US 2009/0224900 A1    Sep. 10, 2009

(30) Foreign Application Priority Data

Dec. 15, 2004  (JP) .............................. 2004-362700

(51) Int. Cl.
*B60C 23/00* (2006.01)
(52) U.S. Cl. ...................... 340/442; 73/146.5; 340/445; 340/686.3
(58) Field of Classification Search ............. 340/442, 340/686.3; 73/146.5
See application file for complete search history.

(56) References Cited

U.S. PATENT DOCUMENTS

| 6,591,671 B2 * | 7/2003 | Brown ................. 73/146.5 |
| 6,963,274 B2 | 11/2005 | Saheki et al. |
| 7,317,381 B2 * | 1/2008 | Miyazaki ............ 340/426.33 |
| 7,336,161 B2 * | 2/2008 | Walraet .................. 340/442 |
| 2003/0110851 A1 | 6/2003 | Tsujita |
| 2006/0049923 A1 * | 3/2006 | Miyazaki ............ 340/426.33 |
| 2006/0087420 A1 * | 4/2006 | Walraet .................. 340/445 |
| 2009/0224900 A1 * | 9/2009 | Shimura ................. 340/447 |

FOREIGN PATENT DOCUMENTS

| EP | 1-536-392 A1 | 6/2005 |
| EP | 1536392 A1 * | 6/2005 |
| JP | 5-13802 | 2/1993 |
| JP | 07-257119 | 10/1995 |
| JP | 2001-250186 | 9/2001 |
| JP | 2001-322411 | 11/2001 |

(Continued)

OTHER PUBLICATIONS

International Search Report for PCT/JP2005/023026 dated Mar. 14, 2006.

(Continued)

*Primary Examiner*—Daniel Wu
*Assistant Examiner*—Bradley E Thompson
(74) *Attorney, Agent, or Firm*—Knobbe, Martens, Olson & Bear, LLP (57) ABSTRACT

Acquired wheel information such as temperature data and inflation pressure data is surely transmitted from a transmitter in a status where the transmitter is not located in a dead space, by controlling timing wherein the transmitter acquires the wheel information, a transmission time width and transmitting timing of the data to be transmitted from the transmitter by radio.

25 Claims, 5 Drawing Sheets

FOREIGN PATENT DOCUMENTS

| | | | |
|---|---|---|---|
| JP | 2001322411 A | * | 11/2001 |
| JP | 2003-182325 | | 7/2003 |
| JP | 2003-237328 | | 8/2003 |
| JP | 2003-272060 | | 9/2003 |
| WO | WO 2004/021302 | | 3/2004 |

OTHER PUBLICATIONS

International Preliminary Report on Patentability from PCT/JP2005/023026 dated Jun. 28, 2007.

Office Action for corresponding Japanese application No. 2006-520607 dated Dec. 8, 2009.

* cited by examiner

FIG.1

10 TIRE INFLATION PRESSURE MONITORING SYSTEM

14 TRUCK VEHICLE

WHEEL INFORMATION ACQUIRING SYSTEM

CROSS REFERENCE TO RELATED APPLICATIONS

This application claims to benefit and priority to and is a U.S. National Phase of PCT International Application Number PCT/JP2005/023026, filed on Dec. 15, 2005, designating the United States of America, which claims priority under U.S.C. §119 to Japanese Application 2004-362700 filed on Dec. 15, 2004. The disclosures of the above-described applications are hereby incorporated by reference in their entirety.

TECHNICAL FIELD

The present invention relates to a wheel information acquiring system that acquires wheel information, including tire inflation pressure and tire temperature, for example, of wheels mounted on various vehicles such as passenger cars, buses, trucks or other vehicles having at least four wheels, or vehicles having two wheels.

BACKGROUND ART

Nowadays it has been proposed to mount a tire inflation pressure warning system to various vehicles that have wheels each including a rim and a tire assembled to the rim, such as passenger cars, buses, trucks, and motorbikes in order to constantly monitor the inflation pressure of the tire so that, if needed, an alert indicating abnormal situation of the tire inflation pressure is issued.

Tire inflation pressure warning systems generally include pressure sensors for measuring tire inflation pressure, and transmitters for wirelessly transmitting the measured inflation pressure, that are provided in tire cavity regions of the plurality of tires respectively. The tire cavity region, in this context, is a region surrounded by a tire inner circumference surface and a bottom surface of a rim bottom, to which air is filled. On the other hand, to the vehicle body side, a receiver for receiving the inflation pressure data wirelessly transmitted by the transmitters provided in the plurality of tires, and display means for informing the vehicle's driver of a tire status, according to the inflation pressure data acquired by the receiver are provided. In the receiver, the inflation pressure of the tire is constantly monitored to determine whether the inflation pressure is abnormal or not. In case of abnormal situation, an alert indicating that the tire inflation pressure is abnormal is issued to the vehicle's driver, through the display means.

In such tire inflation pressure warning systems, inflation pressure data is periodically transmitted from each transmitter provided in each of the plurality of tires. In this situation, there have been cases where data transmission timings from the transmitters overlap with each other, to cause interference of radio waves, resulting in data communication problems, and preventing the receiver from receiving the inflation pressure data normally.

PATENT DOCUMENTS 1-4 below describe examples of a tire inflation pressure warning system that solves the data communication problems which may be caused in a situation, as described above, where respective transmitters provided in respective tires transmit inflation pressure data respectively, and periodically.

PATENT DOCUMENT 1: JP2001-250186 A

PATENT DOCUMENT 2: JP 7-257119 A

PATENT DOCUMENT 3: JP 2001-322411 A

PATENT DOCUMENT 4: JP 2003-237328 A

DISCLOSURE OF THE INVENTION

Problems to be Solved by the Invention

PATENT DOCUMENT 1 describes a tire inflation pressure warning system that prevents overlapping of data transmission timings of transceivers respectively provided in a plurality of tires. The tire inflation warning system described in PATENT DOCUMENT 1 starts its operation upon receiving an operation start signal, and sets data transmission timing with respect to the operation start signal. In this manner, the tire inflation pressure warning system of PATENT DOCUMENT 1 prevents the overlapping of data transmission timings of the transceivers by preventing accumulation of gaps in data transmission timings of the transceivers respectively provided in the plurality of tires that would otherwise occur due to, such as, errors in oscillation frequencies used for the operation of the transceivers.

PATENT DOCUMENT 2 describes a device for warning of air pressure reduction for each tire with the use of electromagnetic wave that identifies air pressure decrease on an each tire basis. The device for warning of air pressure reduction for each tire described in PATENT DOCUMENT 2 modulates carrier frequencies of electromagnetic wave signals transmitted from the transmitters respectively provided in the plurality of tires, at different time intervals to each other. Therefore, the device for warning of air pressure reduction for each tire described in PATENT DOCUMENT 2 prevents interferences, even if the carrier frequencies are the same, by differentiating the time intervals of the modulation of the data to be transmitted.

PATENT DOCUMENT 3 describes a tire inflation pressure warning system in which an air pressure detecting device built in a tire can be set to any desired mode from outside so that the power consumption in the air pressure detecting device is suppressed to a minimum level, and such control is performed easily. In PATENT DOCUMENT 3, each detecting device (transmitter) can set its operation mode to any desired mode, based on the radio waves transmitted from a setting device (receiver). In the tire inflation pressure warning system of PATENT DOCUMENT 3, the detecting devices are operated only when necessary so as to suppress power consumption, and the transmission intervals of the detecting devices are arbitrarily set in order to prevent collision of transmission radio waves from the detecting devices.

PATENT DOCUMENT 4 provides a tire condition monitoring apparatus and a transmitter of the tire state monitoring apparatus that allow transmitted data to be appropriately received by a receiver. In the tire condition monitoring apparatus described in PATENT DOCUMENT 4, if a vehicle speed sensor of each transmitter detects movement of the vehicle after once stop of the vehicle has been detected, a transmission controller of each transmitter calculates a delay time which varies by each transmission, based on a unique ID code previously registered in a ROM. After each of the different delay times has elapsed, each transmitter measures air pressure and temperature to perform data transmission at a predetermined interval. In this way, it is possible to prevent collision of transmission waves from the transmitters, that would otherwise occur when transmitters transmit data at different timings.

PATENT DOCUMENTS 1 to 4, as described above, employ a structure in which transmitters respectively provided in a plurality of wheels transmit wheel information at different transmission timings (or at different modulation time intervals). PATENT DOCUMENTS 1 to 4, by employing such structure, prevent communication errors and ensure that the receiver reliably receives the wheel information of each wheel.

However, the wheel information acquiring systems described above may have problems in which, for example, an antenna can not receive the data transmitted by a transmitter if transmission output is set to a level lower than the ambient noise level and the relative distance between the transmitter and the antenna is long.

Figure 6:
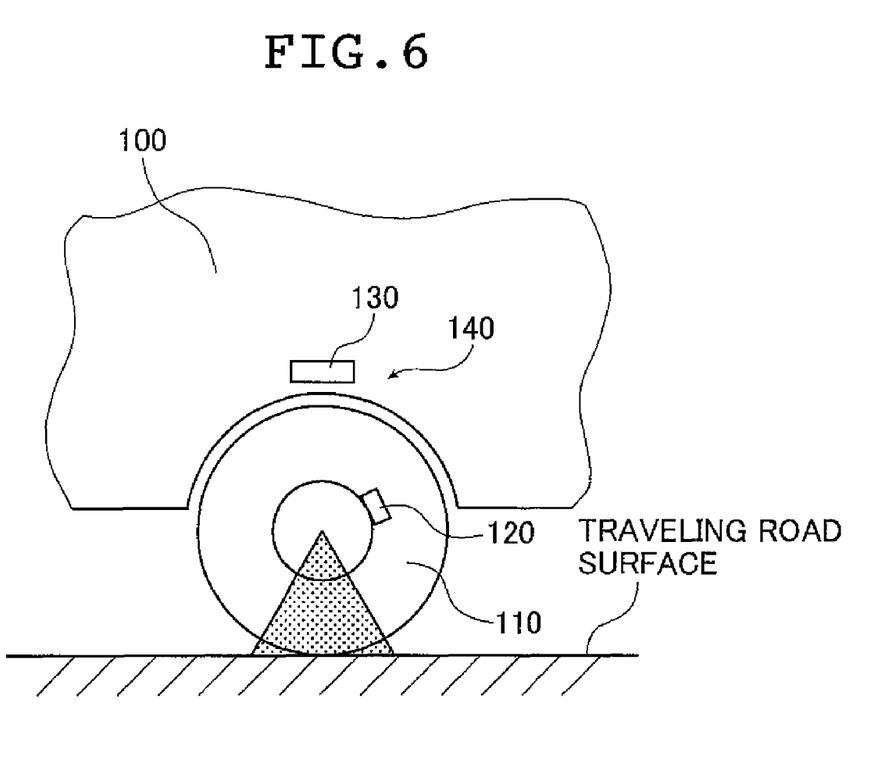
FIG. 6 is a side view of a vehicle illustrating a problem associated with conventional wheel information acquiring systems.

FIG. 6 is a car side view explaining problems associated with conventional wheel information acquiring systems. An example shown in FIG. 6 acquires wheel information of a tire 110 which is mounted to a vehicle 100. In FIG. 6, a transmitter 120 is provided in a tire cavity region which is surrounded by a tire inner circumference surface and a bottom surface of a rim bottom, and to which air is filled. A receiving antenna 130 for receiving wheel information transmitted from the transmitter 120 is provided in a tire house 140 of the vehicle 100. The transmitter 120 provided in the tire 110 moves with the travel of the vehicle 100 (i.e. rotation of the tire 110) to which the tire 110 is mounted. This changes the relative positions of the receiving antenna 130 provided in the tire house 140 of the vehicle 100 and the transmitter 120.

If the transmitter 120 is located in a region close to a traveling road surface which is represented by a shadowed portion in FIG. 6 (hereinafter referred to as the dead space), the distance between the receiving antenna 130 and the transmitter 120 becomes longer compared to a case in which the transmitter 120 is located other than the dead space. As a result, problems may occur in which, if the transmitter 120, as being located in the dead space, wirelessly transmits wheel information, the transmission wave may not reach the receiving antenna 130 with a sufficient strength, resulting in communication errors. Further, even if the transmission waves directly reach the receiving antenna 130 with a certain strength, reflection waves from a ground surface become also strong, if the transmitter 120 is located in the dead space. As a result, fading is caused by the reflection waves and the data directly transmitted from the transmitter 120 to the receiving antenna 130, resulting in communication errors. Moreover, if the transmitter 120 is in the dead space, the tire 110, not shown hub and shaft that connect between the tire 110 and the vehicle 100, a brake, and other various components may serve as obstacles to cause communication errors.

In PATENT DOCUMENTS 1 to 4, the transmitters respectively provided in the plurality of tires transmit tire information at respective different transmission timings (or different modulation time intervals). However, even in such cases, there have been problems. For example, in each tire, the transmission timing from the transmitter 120 can coincident with the timing when the transmitter is located in the dead space. This may cause communication errors and the receiver 130 can not receive the wheel information even if the transmitter 120 transmits the tire information. As described, probability in which the wheel information transmitted by the transmitter 120 is received by the receiving antenna 130, is significantly affected by the size of the dead space in the vehicle 100 as well as by the relative positions of the receiving antenna 130 and the transmitter 120 at a timing when the transmitter 120 transmits the wheel information.

The transmission timing from the plurality of transmitters, and the relative positional relationship between the transmitter and the receiver as described above are not considered in the reference documents described above. Therefore, there exist problems in which even if the transmitters respectively provided in the plurality of wheels transmit the tire information at different transmission timings (or different modulation time intervals), in each traveling tire, the wheel information which is transmitted at a timing when the transmitter is in the dead space cannot be received by the receiver (receiving antenna).

With respect to the above problems, an object of the present invention is to provide a wheel information acquiring system in which a receiver can reliably receive the transmitted data, even if the data is transmitted by a wheel of a traveling vehicle.

Means to Solve the Problems

The present invention has been made to achieve the aforementioned object and to provide A wheel information acquiring system that is attached to a wheel and acquires wheel information of the wheel during rotation, the wheel information acquiring system comprising:

a first communication device that is attached to the wheel and detects wheel information associated with the wheel during rotation, and wirelessly transmits the detected wheel information from a wheel side; and a second communication device that is provided apart from the wheel and that receives and acquires the wheel information transmitted by the first communication device, wherein:

the first communication device has a maximum value of rotation speed specified for the wheel during rotation to which the first communication device is attached; and when a transmission time width of one packet of the wheel information transmitted by the first communication device is represented by $T_1$, and an expected minimum rotation period which is determined according to the maximum value of the rotation speed prespecified in the first communication device is represented by $R_1$, the $T_1$ is set so as to satisfy $T_1 \leq R_1 \cdot \frac{1}{2}$.

Preferably, the $T_1$ is set so as to satisfy $T_1 \leq R_1 \cdot \frac{1}{12}$.

Preferably, the first communication device is attached to a wheel to be mounted to a vehicle to which a maximum traveling speed is previously set, and the maximum value of the rotation speed to be specified in the first communication device is calculated based on the maximum traveling speed of the vehicle and an outer diameter of the wheel.

Preferably, the maximum traveling speed of the vehicle is in a range of 90 (km/h)-300 (km/h).

Preferably, the maximum value of the rotation speed is calculated using an outer diameter of a wheel that has a smallest outer diameter among wheels to be mounted to the vehicle.

Preferably, the first communication device detects the wheel information at an acquiring time interval $T_2$, and repeatedly transmits the detected wheel information at each detection at a transmission interval $T_3$, and the acquiring time interval $T_2$ and the transmission interval $T_3$ are set so as to satisfy $T_3 \leq T_2 \cdot \frac{1}{10}$.

Preferably, the first communication device detects the wheel information at an acquiring time interval $T_2$, repeatedly transmits the detected wheel information at each detection a number of repeat times PN (times).

In repeating the transmission of same wheel information a number of repeat times PN (times), when a repeat transmission time width between start of first wheel information transmission and completion of PN-th wheel information transmission is represented by $T_4$, the transmission time width $T_1$, the number of repeat times PN, and the repeat transmission time width $T_4$ are set so as to satisfy $T_1 \cdot PN \leq T_4 \cdot \frac{1}{4}$. In that case, the transmission time width $T_1$ and the acquiring time interval $T_2$ are preferably set so as to satisfy $500 \cdot T_1 \leq T_2$.

Preferably, a plurality of transmission intervals $T_3$ used in repeating the transmission of the same wheel information are respectively set to different intervals.

Preferably, the acquiring time interval $T_2$, the transmission time width $T_1$, and the number of repeat times PN are set so as to satisfy 120 (sec)$\leq T_2 \leq$660 (sec), $T_1 \leq$100 (msec), and PN$\leq$12 (times) respectively.

Preferably, the first communication device transmits, in addition to each packet of wheel information, count information for each group of wheel information that is detected at the acquiring interval $T_2$ to allow identification of each unit of wheel information.

Preferably, the first communication device transmits, in addition to each packet of wheel information, count information for each group of wheel information that is detected at the acquiring interval $T_2$ to allow identification of each unit of wheel information.

Preferably, the first communication device transmits, in addition to the wheel information, power supply voltage information of the first communication device.

The present invention also provides a wheel information acquiring system that is attached to a wheel and acquires wheel information of the wheel during rotation, the wheel information acquiring system comprising:

a first communication device that is attached to the wheel and detects wheel information associated with the wheel during rotation, and repeatedly transmits by wireless the detected wheel information from a wheel side with repetition of a number of repeat times PN (times); and a second communication device that is provided apart from the wheel and that receives and acquires the wheel information transmitted by the first communication device, wherein:

the first communication device has a minimum value of rotation speed specified for the wheel during rotation to which the first communication device is attached; and when a repeat transmission time width between start of first wheel information transmission and completion of PN-th wheel information transmission is represented by $T_4$, and an expected maximum rotation period of the vehicle which is determined according to the minimum value of the rotation speed prespecified in the first communication device is represented by $R_2$, the $T_4$ is set so as to satisfy $R_2 \cdot 1/12 \leq T_4$.

Preferably, the $T_4$ is set so as to satisfy $R_1 \cdot 1/2 \leq T_4$.

Preferably, the first communication device is attached to a wheel to be mounted to a vehicle to which a minimum traveling speed is previously set, and the minimum value of the rotation speed to be specified in the first communication device is calculated based on the minimum traveling speed of the vehicle and an outer diameter of the wheel.

Preferably, the minimum traveling speed of the vehicle is in a range from 10 (km/h) to 50 (km/h).

Preferably, the minimum value of the rotation speed is calculated using an outer diameter of a wheel that has a largest outer diameter among wheels to be mounted to the vehicle.

The present invention further provides a wheel information acquiring system that is attached to a wheel and acquires wheel information of the wheel during rotation, the wheel information acquiring system comprising:

a first communication device that is attached to the wheel and detects wheel information associated with the wheel during rotation, and repeatedly transmits by wireless the detected wheel information from a wheel side with a repetition of a number of repeat times PN (times); and a second communication device that is provided apart from the wheel and that receives and acquires the wheel information transmitted by the first communication device, wherein:

the first communication device has a maximum value and a minimum value of rotation speed specified for the wheel during rotation to which the first communication device is attached;

when a transmission time width of one packet of the wheel information transmitted by the first communication device is represented by $T_1$, and an expected minimum rotation period of the vehicle which is determined according to the maximum value of the rotation speed prespecified in the first communication device is represented by $R_1$, the $T_1$ is set so as to satisfy $T_1 \leq R_1 \cdot 1/2$; and when a repeat transmission time width between start of first wheel information transmission and completion of PN-th wheel information transmission is represented by $T_4$, and an expected maximum rotation period of the vehicle which is determined according to the minimum value of the rotation speed prespecified in the first communication device is represented by $R_2$, the $T_4$ is set so as to satisfy $R_2 \cdot 1/12 \leq T_4$.

Preferably, the $T_1$ is set so as to satisfy $T_1 \leq R_1 \cdot 1/12$

Preferably, the $T_4$ is set so as to satisfy $R_2 \cdot 1/2 \leq T_4$.

Preferably, the first communication device is attached to a wheel to be mounted to a vehicle to which a maximum traveling speed and a minimum traveling speed are previously set; the maximum value of the rotation speed to be specified in the first communication device is calculated based on the maximum traveling speed set to the wheel and an outer diameter of the wheel; and the minimum value of the rotation speed to be specified in the first communication device is calculated based on the minimum traveling speed set to the wheel and an outer diameter of the wheel.

Preferably, the maximum traveling speed set to the vehicle is in a range of 90 (km/h)-300 (km/h) and the minimum traveling speed set to the vehicle is in a range of 10 (km/h)-50 (km/h).

Preferably, the maximum value of the rotation speed is calculated using an outer diameter of a wheel that has a smallest outer diameter among the wheels to be mounted to the vehicle and the minimum value of the rotation speed of the wheel during rotation is calculated using an outer diameter of a wheel that has a largest outer diameter among the wheels to be mounted to the vehicle.

EFFECTS OF THE INVENTION

The wheel information acquiring system according to the present invention ensures that wheel information wirelessly transmitted by a transmitter provided to a wheel can be reliably received by a receiver, even when the wheel is rotating.

| Legend | |
|---|---|
| 10 | tire inflation pressure monitoring system |
| 12a-12f | wheel |
| 14 | truck vehicle |
| 16a-16f | transmitter |
| 18a-18f | receiver communicating portion |
| 20 | receiver body portion |
| 22 | display |
| 44 | circuit board |
| 46 | pressure sensor |
| 47 | temperature sensor |
| 48 | amplifying circuit |
| 50 | control circuit |
| 52, 76 | microprocessor |
| 54, 78 | memory |
| 56 | transmitting circuit |
| 60, 66 | antenna |
| 68 | amplifying circuit |
| 72a -72f | demodulating circuit |
| 79 | signal processing circuit |

BEST MODE FOR CARRYING OUT THE INVENTION

Hereinafter, a wheel information acquiring system according to the present invention will be described in detail based on a preferred embodiment shown in the accompanying drawings.

Figure 1:
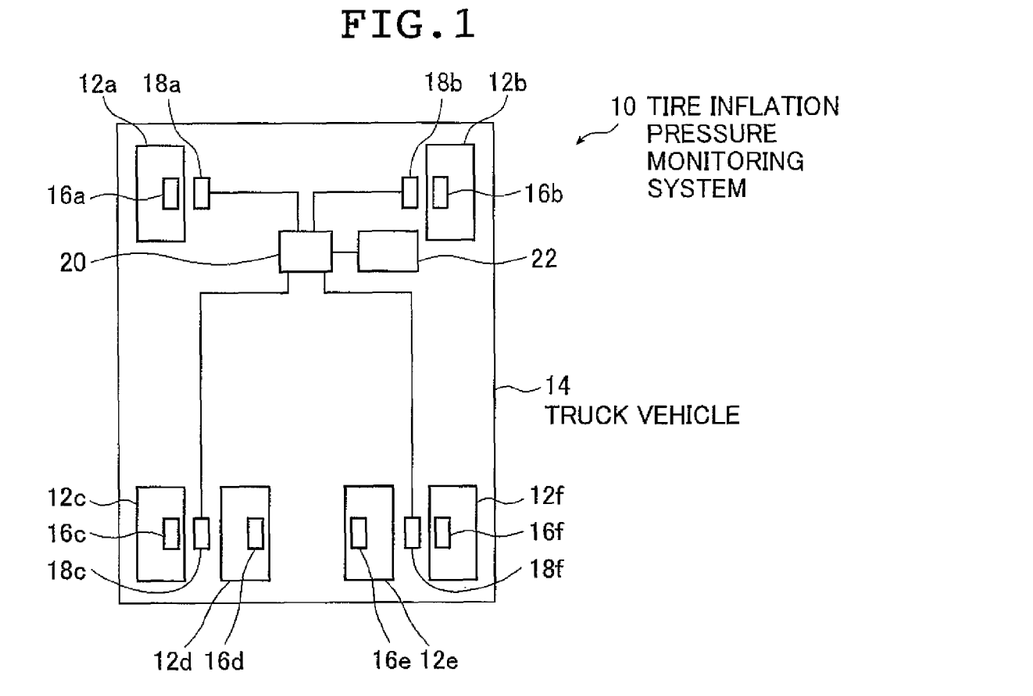
FIG. 1 is a schematic configuration diagram illustrating a tire inflation pressure monitoring system as an example of the wheel information acquiring system of the present invention.

FIG. 1 shows a tire inflation pressure monitoring system (hereinafter referred to as the system) 10 of a truck vehicle as an example of a wheel information acquiring system of the present invention.

FIG. 1 shows a state in which wheels 12a-12f, each an assembly of a tire and a rim, are mounted in wheel mounting positions of a truck vehicle 14. In cavity regions of the wheels 12a-12f, transmitters (first communication devices) 16a-16f are mounted respectively, in such a manner that each of the transmitters 16a-16f is fixed to a bottom surface of a rim bottom which serves as a wall surface of the cavity region. Each of the transmitters 16a-16f has a pressure sensor and a temperature sensor, and wirelessly transmits inflation pressure data and temperature data measured by each sensor.

A vehicle body portion of the truck vehicle 14 to which the wheels 12a-12f are mounted has receiver communicating portions 18a-18f. Each of the receiver communicating portions 18a-18f has an antenna and an amplifier and is disposed near a tire house to which each wheel is mounted. The receiver communicating portions 18a-18f are connected by wire to one receiver body portion 20, and receive information transmitted from the transmitters 16a-16f by wireless. The receiver body portion 20 is connected to a display 22 which can display information to inform the driver of the track vehicle 14. The information includes inflation pressure data and, if necessary, remaining level of power supply battery (power supply voltage) of each of the transmitters 16a-16f and other information. In this example, the receiver communicating portion 18c is configured to receive a transmission signal from the transmitters 16c, 16d, and the receiver communicating portion 18f is configured to receive a transmission signal from the transmitters 16e, 16f.

The receiver communicating portions 18a-18f and the receiver body portion 20 serve as the second communication device of the present invention. The receiver communicating portions 18a-18f mainly receive measurement data such as inflation pressure data and temperature data.

The transmitters 16a-16f transmit inflation pressure data and temperature data of the respective tires, and power supply voltage data, transmission ID and count data of the respective transmitters 16a-16f, by wireless at predetermined time intervals. The transmission ID and the count data will be described later.

Figure 2:
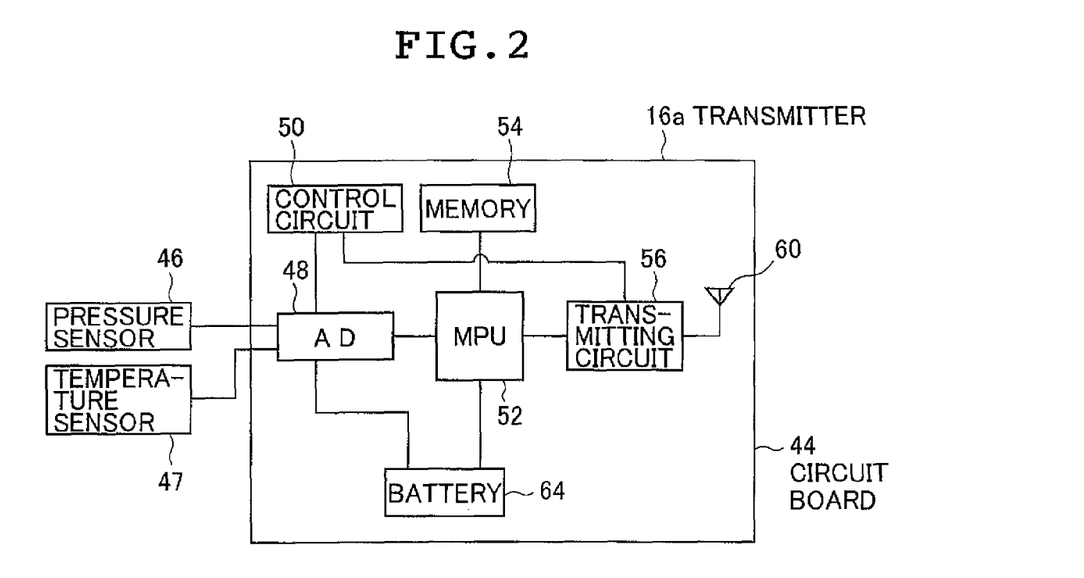
FIG. 2 is a schematic configuration diagram of a transmitter of the tire inflation pressure monitoring system shown in FIG. 1.

Since the transmitters 16b-16f are the same in configuration as the transmitter 16a, description will be given on the transmitter 16a as the representative of the transmitters 16a-16f, and description on transmitters 16b-16f will be omitted. FIG. 2 shows a schematic configuration diagram of the transmitter 16a.

The transmitter 16a has circuits arranged on a circuit board 44, and is connected to a pressure sensor 46 that measures tire inflation pressure and a temperature sensor 47.

Pressure sensors that can be used as the pressure sensor 46 for measuring gage pressure, differential pressure, or absolute pressure, include a semiconductor pressure sensor and a capacitance type pressure sensor. Temperature sensors that can be used as the temperature sensor 47 for measuring the temperature inside the cavity region of the tire, include a semiconductor thermo-sensor and a resistance element thermo-sensor. The pressure sensor 46 and the temperature sensor 47 are connected to an AD converting circuit 48 which will be described later.

The circuit board 44 has the AD converting circuit (AD) 48, a control circuit 50, a microprocessor (MPU) 52, a memory 54, a transmitting circuit 56, a transmission antenna 60, and a battery 64 as a power supply for the circuits.

The AD converting circuit 48 is connected to the pressure sensor 46, the temperature sensor 47, and the battery 64. The AD converting circuit 48 is a portion that converts the pressure data measured by the pressure sensor 46, the temperature data measured by the temperature sensor 47, and the power supply voltage data (data indicating remaining level of power supply battery) measured by a not shown voltage sensor provided in the battery 64, into digital signals, for example, 8-bit signals. Hereinafter, the pressure data and the temperature data are collectively called as wheel data, and the wheel data and the power supply voltage data are collectively called as measurement data.

The control circuit 50 is a portion that controls the measuring timing at which inflation pressure and temperature of a tire are measured, and controls the transmission time width and the transmission time interval of transmission data when transmitting transmission data from the transmission antenna 60 towards the receiver communicating portion 18a. The transmission data contains the measurement data obtained through measurement, a transmission ID, count data, and a cyclic redundancy check code, which will be described later.

The control circuit 50 may be configured as a dedicated circuit, or programmed in the MPU 52. In order to prevent the AD converting circuit 48, the MPU 52, and the transmitting circuit 56 from consuming higher driving power, a sleep mode may be used. In the sleep mode, the AD converting circuit 48, the MPU 52, and the transmitting circuit 56 are driven with a predetermined time interval, instead of operating constantly, and during the interval, no processing and transmission are carried out in the transmitter 16a. This reduces power consumption in the battery 64, and allows the transmitter 16a to monitor the tire inflation pressure for a longer period of time. In this case, if the tire inflation pressure is out of a predetermined allowable range, and therefore determined as abnormal, the measurement time interval is changed to a shorter time interval. The control circuit 50 is connectable to a not shown input device so that a transmission condition value and various transmission parameter values can be inputted from outside. The transmission condition value is used for controlling the transmission time interval, the transmission time width and the like. The various transmission parameter values are used for calculating and setting the transmission condition value by the control circuit 50 itself. The transmission condition value and the various transmission parameter values will be described later in detail.

The antenna 60 is configured to emit radio waves of 315 MHz, for example, towards the receiver communicating portion 18a. A known battery such as CR-2032 (coin-shaped manganese dioxide-lithium battery) is employed as the battery 64. The battery 64 has a not shown voltage sensor capable of measuring the output voltage of the battery 64 itself. The voltage sensor is connected to the AD converting circuit 48 and sends the power supply voltage data of the battery 64 to the AD converting circuit 48.

The MPU 52 generates transmission data which will transmitted to a receiver 18 (i.e., receiver communicating portions 18a). The MPU 52 assigns identification information (ID) of the transmitter 16a retrieved from the memory 54 to the measurement data which is AD-converted and supplied by the AD converting circuit 48. The identification information (ID) of the transmitter 16a enables the transmitter 16a to be distinguished from other transmitters 16b-16f. The MPU 52 also assigns count information and a cyclic redundancy check code (CRC; cyclic redundancy check code) to the above information, thus generating one unit (one packet) of transmission data to be transmitted to the receiver 18. The count information is used to verify that the wheel information repeatedly transmitted from the transmitter 16a is the same time. The cyclic redundancy check code is used in performing known cyclic redundancy check (CRC; cyclic redundancy check) to detect errors in the transmission data. The MPU 52 controls the operation of each circuit and issues any abnormality on the transmission circuit when detected through a self-diagnostic function, in a form of a predetermined abnormality code.

The signal of transmission data to be generated in the MPU 52 is generated such that signals each in a predetermined format signal continue repeatedly. The ID and the count information are signals in which 0 and 1 of a specific number of bits are arranged according to a predetermined rule.

The count data is used to determine, by checking the count data at the receiver side, whether the received one packet of transmission data is the same as the transmission data which has already been received or not.

The count data is a four-bit signal. When measurement data (inflation pressure data, temperature data, and power supply voltage data) is newly acquired and supplied to the MPU 52, the MPU 52 updates the count data by sequentially incrementing the previous count data, and new and updated count data is assigned to the newly supplied measurement data. The same count data is assigned to every unit (one packet) of the same transmission data group.

The MPU 52 also assigns a cyclic redundancy check code to the data (measurement data, ID, and count data). In this way, the MPU 52 generates one packet of transmission data containing inflation pressure data, temperature data, power supply voltage data, an ID, count information, and an cyclic redundancy check code as one group.

The memory 54, in addition to storing the ID of the transmitter 16a, may store the measured inflation pressure data and temperature data, as well as voltage data and the count information.

The transmitting circuit 56 has a not shown oscillating circuit that generates a carrier wave of a predetermined frequency, for example, of 315 MHz, a not shown modulating circuit that modulates the carrier wave according to the transmission signal generated in the MPU 52 and generates a high frequency signal with the carrier wave modulated, and a not shown amplifying circuit that amplifies the high frequency signal. The carrier wave may be modulated according to any known scheme such as an ASK (Amplitude shift keying) scheme, an FSK (Frequency shift keying) scheme, a PSK (Phase shift keying) scheme, a multi-PSK scheme such as QPSK or 8-PSK, or a multi-ASK scheme such as 16QAM or 64QAM. The description heretofore has been given for explaining the configuration of the transmitter 16a.

Figure 3:
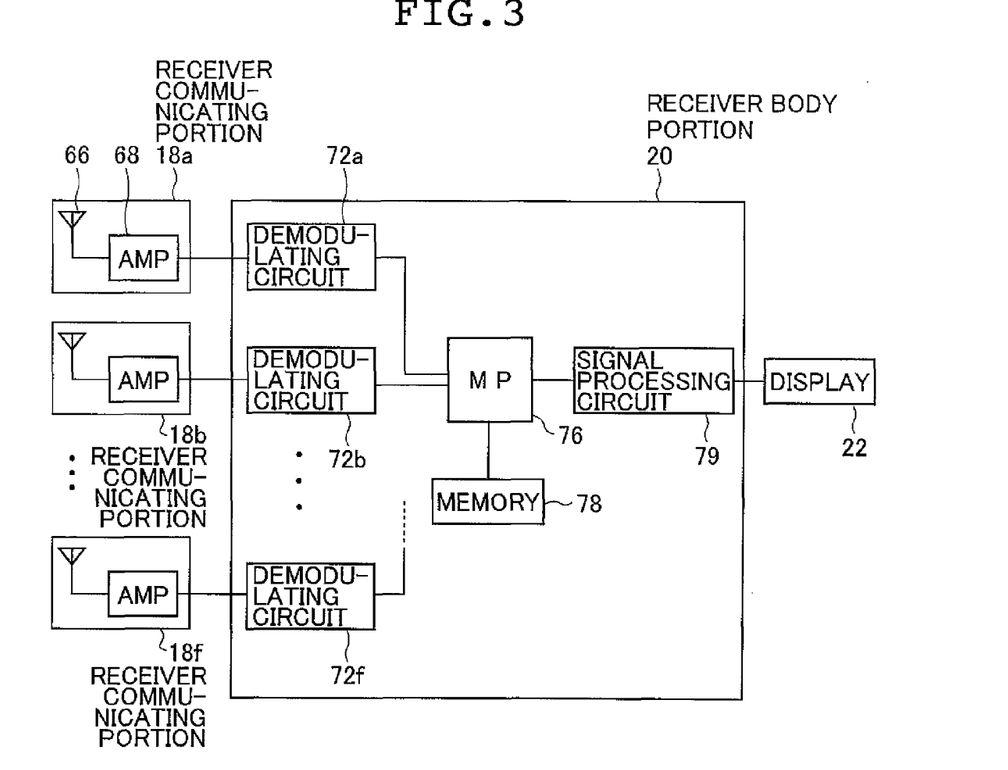
FIG. 3 is a schematic configuration diagram of a receiver of the tire inflation pressure monitoring system shown in FIG. 1.

FIG. 3 is a schematic configuration diagram showing a receiver body portion 20, and receiver communicating portions 18a, 18b, 18c, 18d, 18e, and 18f, which are connected to the receiver body portion 20. Since the receiver communicating portions 18a-18f are the same in configuration, only the receiver communicating portion 18a will be described as the representative.

The receiver communicating portion 18a includes an antenna 66, and an amplifying circuit 68. The antenna 66 is configured to receive radio waves, of 315 MHz for example, transmitted by the transmitter 16a. The amplifying circuit 68 is configured by using such as an EFT (field effect transistor), and amplifies the received high frequency signal and supplies the high frequency signal to the receiver body portion 20.

The receiver body portion 20 demodulates the transmission data from the high frequency signal supplied from the receiver communicating portions 18a-18f to retrieve the measurement data (inflation pressure data, temperature data, and power supply voltage data), the ID, and the count information. Then the receiver body portion 20 acquires the mounting position information of the tire corresponding the retrieved ID, by using the data of collation that is previously set and registered in the receiver body portion 20. The mounting position information indicates a specific mounting position of a wheel that corresponds to the transmitted tire inflation pressure data and temperature data, and also indicates a specific mounting position of a transmitter of a wheel that corresponds to the transmitted voltage data. The receiver body portion 20 performs temperature correction on the inflation pressure of the tire according to the acquired mounting position information, and monitors the tire inflation pressure using the temperature-corrected inflation pressure data.

The receiver body portion 20, upon receiving the high frequency signal supplied from the receiver communicating portions 18a-18f, determines and classifies the high frequency signal into, for example three categories, such as "normal", "caution", and "warning", by comparing, for example, the temperature-corrected inflation pressure of the tire of the right front wheel to a predetermined value which has been previously set. The determination result is supplied to the display 22 connected to the receiver body portion 20. The display 22 displays the inflation pressure values on an each wheel mounting position basis. The display 22, which may be an instrument panel of the truck vehicle 14, in this example, displays the inflation pressure values and the determination result (status of the inflation pressure). The receiver body portion 20 also determines and classifies the voltage status into three categories of "normal", "caution", and "warning", by comparing, for example, the power supply voltage data of the battery 64 of the transmitter 16a to a predetermined value which has been previously set.

The receiver body portion 20 includes demodulating circuits 72a-72f, an MP 76, a memory 78, and a signal processing circuit 79. The demodulating circuits 72a-72f, perform a known filtering process and then perform signal code correction to generate a demodulated signal, and supply the demodulated signal to the MP 76. As the power supply, a not shown built in battery may be used. A battery of the truck vehicle 14 may also be used as the power supply.

The memory 78 stores collation data for collating each ID of the transmitters 16a-16f to a specific mounting position in the vehicle 14.

When the receiver communicating portions 18a-18f receive a transmission signal from the transmitters 16a-16f, the MP 76 acquires an ID, measurement data (inflation pressure data, temperature data, power supply voltage data), and count data from the signal supplied from the demodulating circuits 72a-72f. When such data is acquired, the MP 76 refers to the collation data which is set and stored in the memory 78 for collating each ID to a specific wheel mounting position information. This identifies, from the acquired ID, a specific wheel that corresponds to the received wheel data (inflation pressure data and temperature data), and a specific transmitter that corresponds to the received power supply voltage data.

In this case, the MP 76 performs cyclic redundancy check on the demodulated transmission signal using a cyclic redundancy check code to determine whether the transmission signal is correct or not and to detect errors. The MP 76 corrects the detected errors if any.

The MP 76 also determines, by using the count data, whether or not the transmission data supplied from each of the demodulating circuits 72a-72f is the data that has been already received. The memory 78 is capable of storing the received count data. The MP 76 retrieves the memory 78 to determine whether or not any count data that matches to the received count data is stored.

If there is no count data that matches to the received count data, the MP 76 determines that the received measurement data is newly acquired data, and supply the measurement data transmitted with such count data to the signal processing circuit 79. The count data is stored in the memory 78. If there is count data that matches to the received count data, the MP 76 determines that the received measurement data is the same as the data that has been already received. In the MP 76, no process is performed on the measurement data transmitted with such count data and the data is deleted.

The signal processing circuit 79 is connected to the MP 76 and generates a signal applicable to the display 22. For example, the signal processing circuit 79 uses the temperature data transmitted from the MP 76 to perform temperature-correction on the inflation pressure data, and outputs the temperature-corrected inflation pressure data and the power supply voltage data to the display 22.

The description heretofore has been given for explaining the configuration of the receiver communicating portions 18a-18f and the receiver body portion 20.

Next, the operation of the wheel information acquiring system 10 will be described using the transmitter 16a, as the representative for the transmitters 16a-16f.

FIGS. 4A to 4D are schematic drawings explaining positional relationship between the transmitter 16a mounted to the wheel 12a and the dead space of the traveling vehicle 14. The transmitter 16a fixed to the wheel 12a of the vehicle 14 moves with the travel of the vehicle (i.e., rotation of the wheel 12a). Along with this movement, the relative positions of the transmitter 16a and the receiver communicating portion 18a provided in a tire house of the vehicle 14 change as shown in FIGS. 4A, 4B, 4C, and 4D in this order. There exists a region (a dead space) in which it is difficult for the receiver communicating portion 18a to receive transmission data, transmitted by the transmitter 16a by wireless, is at an area close to the traveling road surface on which the vehicle is traveling, in the moving range of the transmitter 16a with respect to the wheel 12a.

In the vehicle 14, the range of the dead space is determined by various conditions, such as transmission output power of the transmitter 16a, receiving sensitivity of the receiver communicating portion 18a, a distance between the wheel 12a and the receiver communicating portion 18a in the vehicle 14, the size and configuration of the wheel 12a, the shape of the tire house, and the like. If the range of the dead space is relatively small, for example, if only the shaded portion in FIGS. 4A-4D is the dead space, a communication error (phenomenon in which the receiver communicating portion 18a cannot receive wheel information transmitted from the transmitter 16a), occurs only when the relative positions of the transmitter 16a and the receiver 18 are in the state shown in FIG. 4C. On the other hand, if the range of the dead space is relatively large, for example, if all of the portion under the dotted line shown in FIGS. 4A-4D is the dead space, such a communication error occurs when the relative positions of the transmitter 16a and the receiver 18a are in the states shown in FIGS. 4B-4D.

Figure 4A:
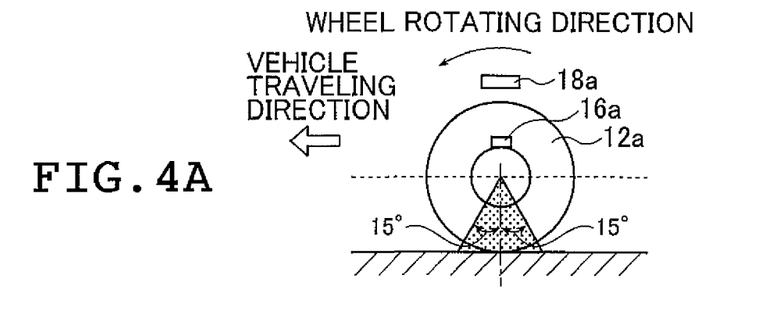
FIGS. 4A to 4D are schematic side views explaining positional relationships between a transmitter mounted to a wheel and a dead space, of a traveling vehicle.
Figure 4B:
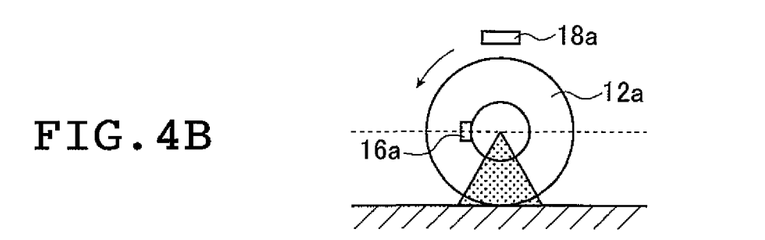
Figure 4C:
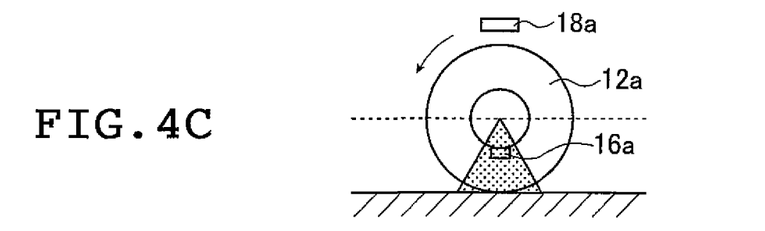
Figure 4D:
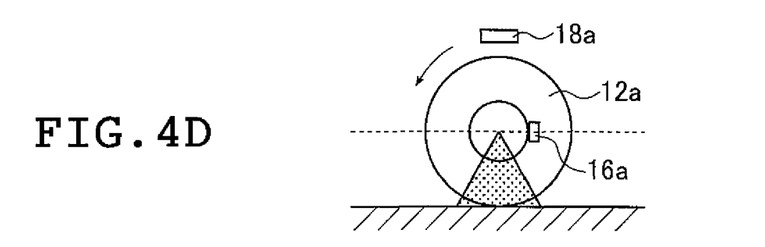

In general, in a vehicle such as a truck and a passenger car, if a transmitter is positioned in an upper half region of the wheel (i.e., a vehicle side (upper side) region, if the tire is divided by a plane that passes through the center of the wheel and that is parallel with the ground as indicated by a dotted line in FIGS. 4A-AD), a receiver communication portion can receive data without problems. The whole of the ground side (lower side) region, if the tire is divided by a plane that passes through the center of the wheel and that is parallel with the ground, has a possibility of becoming the dead space.

Also, in general, the range considered to have a higher probability of becoming the dead space is the range (shaded ranges shown in FIGS. 4A-4D) covering ±15 degrees in the rotation direction of the wheel 12a, with respect to a vertical line that passes through the center of the wheel 12a and that is perpendicular to the road surface.

In this way, the transmission data is transmitted by the transmitter 16a that moves with the rotation of the wheel 12a and repeatedly passes through the dead space.

Figure 5:
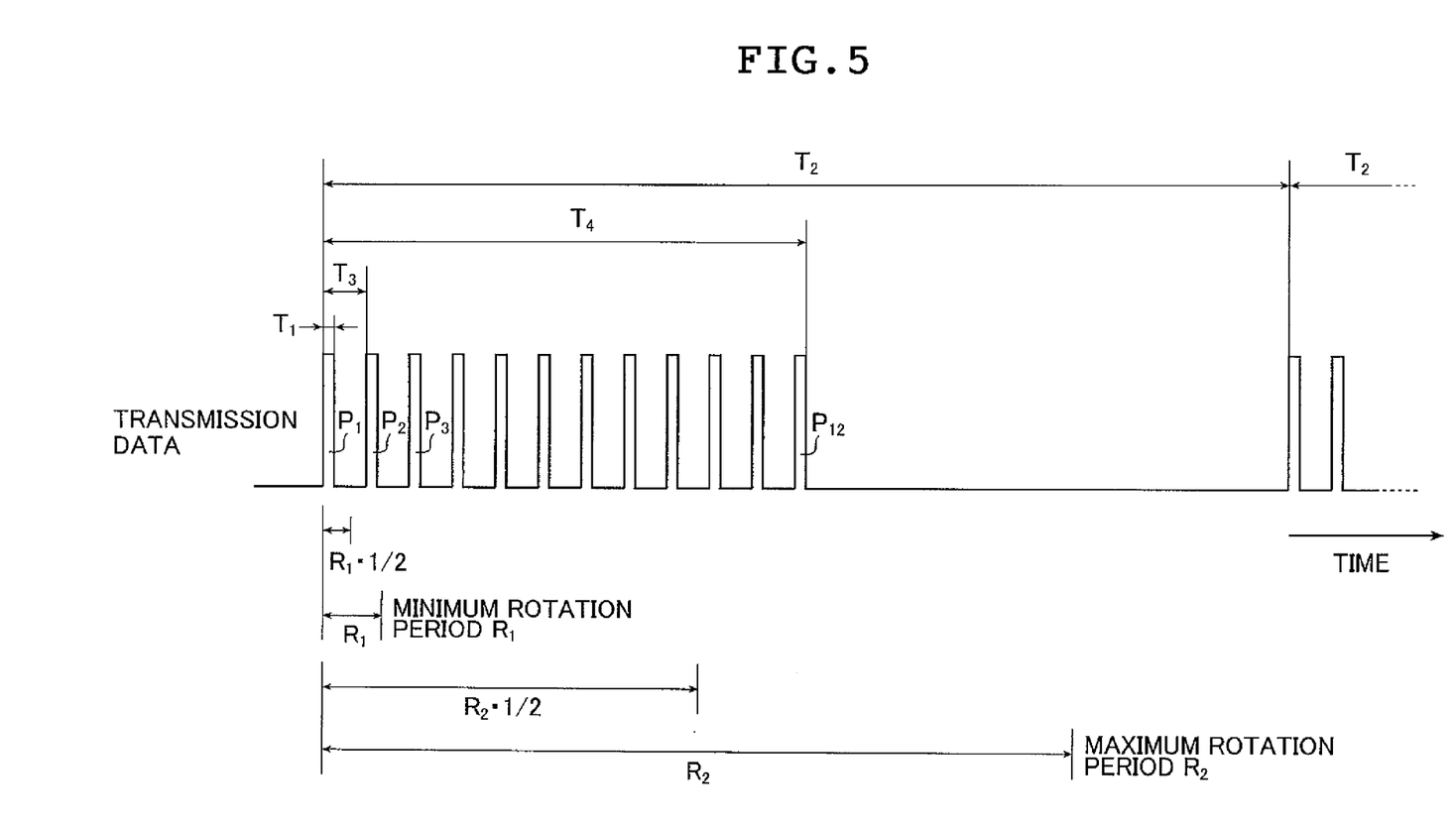
FIG. 5 is an explanatory chart of wheel information transmitted by the transmitter shown in FIG. 2.

FIG. 5 is an explanatory chart of the transmission data transmitted by the transmitter 16a.

In the tire inflation pressure monitoring system 10 of this embodiment, in each of the transmitters 16a-16f, measurement data (inflation pressure data, temperature data, and power supply voltage data) is acquired at a predetermined acquiring time interval $T_2$. And then, a transmission ID, count information, and a cyclic redundancy check code are assigned to the acquired measurement data. The data is thus grouped into one, to produce one packet of transmission data of a transmission time width $T_1$ (packet $P_1$, packet $P_2$, packet $P_3$, ... packet $P_{12}$). The one packet of transmission data of a transmission time width $T_1$ is repeatedly transmitted a predetermined number of transmission times (PN) with a transmission time interval $T_3$. In transmitting the same transmission data that is acquired at one measurement a predetermined number of times PN, the time between the start and the end of the repeated transmission is regard as a repeat transmission time width $T_4$.

In the tire inflation pressure monitoring system 10 of this embodiment, $T_1$ is set to 15 (msec), $T_2$ is set to 600 (sec), $T_3$ is set to 54 (msec), $T_4$ is set to 609 (msec), and PN is set to 12 times, for instance.

These transmission condition values ($T_1$-$T_4$, and PN) are prespecifed in the control circuit 50 of the transmitter 16a.

Setting of the transmission condition values to the control circuit 50 of the transmitter 16*a* may be done at a time when mounting the tire inflation pressure monitoring system 10 to the truck vehicle 14, or at a time when the transmitter 16*a* is manufactured, provided that the vehicle to which the transmitter 16*a* is mounted is previously determined.

The transmission condition values will now be described.

When transmitting the acquired wheel information of the wheel 12*a* from the transmitter 16*a*, the transmission time width $T_1$ of each packet which is repeatedly transmitted is set so as to satisfy $T_1 \leq R_1 \cdot \frac{1}{2}$, where $R_1$ represents the rotation period of the wheel 12*a*, while the vehicle 14 is traveling at a maximum traveling speed.

In other words, one packet $P_m$ (m=any number between 1-12) can be transmitted within a time period shorter than the half of the rotation period $R_1$, while the wheel 12*a* to which the transmitter 16*a* is mounted is rotating at the maximum rotating speed.

When the wheel 12*a* rotates at the maximum rotation speed, and the range of the dead space is relatively large (i.e., the whole of the ground side region, if divided by a plane that passes through the center of the wheel and that is perpendicular to the ground, is the dead space), a time period (from the state shown in FIG. 4B to the state shown in FIG. 4D) in which the transmitter 16*a* is continuously located in an area other than dead space becomes shortest and is the half of the minimum rotation period $R_1$. In such state (the wheel 12*a* rotates with the maximum rotation speed, and the range of the dead space is relatively large), if the time period required for transmitting one packet is longer than the half of the minimum rotation period $R_1$, a transmission error may occur because the transmitter 16*a* enters the dead space before completing transmission of one packet.

In this embodiment, the transmission time width $T_1$ of one packet $P_m$ is set to a period shorter than the half of the rotation period of the wheel 12*a*, at which the wheel 12*a* rotates at the maximum rotation speed. This allows the transmitter 16*a* to transmit one whole packet while the transmitter 16*a* is located in the area other the dead space, even if the range of the dead space in the wheel 12*a* is relatively large (i.e., the whole region of the ground side is the dead space, if the wheel 12*a* is divided by a plane that passes through the center of the wheel 12*a* and that is perpendicular to the ground), and ensures the receiver communicating portion 18*a* to reliably receive the one whole packet.

In order to receive the one whole packet more reliably, $T_1$ and $R_1$ are set so as to satisfy $T_1 \leq R_1 \cdot \frac{1}{12}$. In other words, it is preferable for one packet to be completely transmitted within a time period shorter than 1/12 of the minimum rotation period $R_1$.

The rotation period $R_1$ is calculated based on the maximum traveling speed of the vehicle 14 to which the wheel 12*a* is mounted, and the outer diameter D of the wheel 12*a*. As the maximum traveling speed of the vehicle 14, 90 (km/h) may be used, for example, which is the maximum speed for truck vehicles limited by the limiter. Or, if it is a passenger car in Japan, 180 (km/h) may be used as the maximum speed. If driving a high performance passenger car under no speed limitation, the maximum speed may be set to, for example, 300 (km/h). In the practice of the present invention, it is preferable to set the maximum speed of the vehicles in a range from 90 (km/h) to (300 km/h). The rotation period $R_1$ of the vehicle 12*a* can be represented by a value obtained by dividing the moving speed (distance/time) of the vehicle 14 by the outer diameter (distance) of the wheel 12*a*.

The transmitter 16*a* acquires measurement data at each predetermined acquiring time interval $T_2$, and upon acquiring, transmits the same packet of transmission data of a transmission time width $T_1$ repeatedly at a repeat transmission time interval $T_3$. The acquiring time interval $T_2$ and the repeat transmission time interval $T_3$ are set so as to satisfy $T_3 \leq T_2 \cdot \frac{1}{10}$. The acquiring time interval $T_2$ and the repeat transmission time interval $T_3$ are also set to satisfy $T_3 \leq T_2 \cdot \frac{1}{500}$.

Satisfying the above conditions enables the transmitter 16*a* to repeatedly transmit, during the rotation of the wheel 12*a*, the same transmission data at least 3 times or more, and preferably 10 times or more. In this way, one packet of transmission data having a transmission time width $T_1$ which is short enough is repeatedly transmitted a plurality of times, so that the probability of reception of the transmission data in the receiver communicating portion 18*a* can be improved, even if each transmission has a low probability in communication success.

Moreover, an expected maximum rotation period $R_2$ that is a rotation period of the wheel 12*a* when the vehicle 14 runs at an expected minimum traveling speed, and a time width $T_4$ that is a time duration between the start and the end of repeat transmission of the same transmission data when the same data is repeatedly transmitted, satisfy $R_2 \cdot \frac{1}{2} \leq T_4$. When the wheel 12*a* rotates at the lowest speed (i.e., the rotation period of the wheel 12*a* is the longest), and the range of the dead space is relatively large (i.e., the whole of the ground side region, if divided by a plane that passes through the center of the wheel and that is perpendicular to the ground, is the dead space), a time period (from the state shown in FIG. 4B to the state shown in FIG. 4D) in which the transmitter 16*a* is continuously located in an area other than the dead space becomes longest, and is half of the maximum rotation period R2 of the wheel 12. It may be assumed that the total time $T_4$, in which the plurality of packets are repeatedly transmitted, becomes shorter than the half of the longest rotation period $R_2$ of the wheel 12*a*. In such cases, if the transmission of the transmission data starts when the transmitter 16*a* just enters the dead space, the transmitter 16*a* may finish the repeat transmission of the same transmission data while the transmitter 16*a* is continuously in the dead space. In other words, the same transmission data, even if it is transmitted repeatedly, may not be received by the receiver communicating portion 18*a* at all.

In this embodiment, the transmission data is repeatedly transmitted over a time period which is longer than ½ of the longest rotation period $R_2$, so that even if the range of the dead space is relatively large, it is ensured that the transmission data is transmitted while the transmitter 16*a* is located in an area other than the dead space, thus allowing the receiver 18*a* to reliably receive the transmission data.

If the range of the dead space is relatively small, for example, if the shaded area shown in FIG. 5 is the dead space for example, it is sufficient for the $T_4$ to satisfy $R_2 \cdot \frac{1}{12} \leq T_4$ (where, $\frac{1}{12} = 30°/360°$). In order for the receiver 18*a* to receive the receiving information more reliably, it is preferable for the T4 to satisfy $R_2 \cdot \frac{1}{2} \leq T_4$.

In addition, in this embodiment, the time width $T_4$ that is a time duration between the start and the end of the repeat transmission of the same transmission data, when the same data is transmitted repeatedly, is set so as to satisfy $T_1 \cdot PN \leq T_4 \cdot \frac{1}{4}$, and the acquiring time interval $T_2$ described above is set so as to satisfy $500 \cdot T_1 \leq T_2$.

In other words, when transmitting the same transmission data of a transmission time width $T_1$, repeatedly a plurality of times (12 times), at a repeat transmission interval $T_3$, the actual time period for transmitting the transmission data is set to ¼ or smaller of the total time $T_4$ required for transmitting the same transmission data. In addition to this, the transmission time width $T_1$ of one packet of transmission data is set to $\frac{1}{500}$ or smaller of the acquiring time interval $T_2$.

In this way, not only by setting the transmission time width $T_1$ of one packet of transmission data to a very short time width, but also by repeating the transmission a plurality of times using a longer period of time, collisions of transmission data among transmitters provided in the same vehicle 14 are prevented and the receiving probability of the transmission data is improved. In addition, actual time period for transmitting the transmission data is shortened to achieve reduced power consumption in transmission and extended service life of the battery 64.

In the wheel information acquiring system according to the present invention, it is preferable to satisfy 120 (sec) $T_2 \leq 660$ (sec), $T_1 \leq 100$ (msec), and PN (times)$\leq 12$.

The transmitter 16a of the wheel 12a transmits such transmission data as described thus far.

In the tire inflation pressure monitoring system 10 of this embodiment, the repeat transmission interval $T_3$ which is time interval between packets of the transmission data which is repeatedly transmitted on a packet-by-packet basis is fixed. However, in order to prevent repeating synchronization of the transmission timings among transmitters more reliably, it is preferable to set each of transmission intervals $T_3$ to a different value.

For example, each time when wheel information is detected by the transmitter 16a and measurement data is transmitted from the pressure sensor 46 and the temperature sensor 47 to the AD converting circuit (AD) 48, a different interval may be set according to the value of the detected measurement data, as the repeat transmission interval $T_3$ between packets which are repeatedly transmitted. Examples of values that may be used as the repeat transmission interval $T_3$ between packets include constant values set when manufacturing the transmitter 16a, constant values set when fixing the transmitter 16a, wheel information values detected by the transmitter, detected values of driving power supply voltage of the first communication device, and random numbers generated by a CPU that constitutes the first communication device.

In this way, using various different values as the transmission interval $T_3$ between packets when repeatedly transmitting packets, prevents transmission timings at which transmission data is transmitted from transmitters mounted to a plurality of wheels from repeatedly synchronizing with each other.

Each of the transmission condition values is set in the control circuit 50 in such a manner as described below.

If the shortest rotation period $R_1$ and the longest rotation period $R_2$ of the wheel 12a are known, the shortest rotation period $R_1$ and the longest rotation period $R_2$ may be inputted to the control circuit 50 previously so that the control circuit 50 can automatically calculate and set each transmission condition value If the shortest rotation period $R_1$ and the longest rotation period $R_2$ are not known, the maximum traveling speed of the vehicle 14 and the tire diameter D of the wheel 12a, if known, may be inputted to the control circuit 50. Then the control circuit 50 uses the maximum traveling speed of the vehicle 14 and the tire outer diameter D of the wheel 12a to calculate the shortest rotation period $R_1$ of the wheel 12a, and uses the shortest rotation period $R_1$ to calculate and set the transmission condition value. Also, in a similar manner, the minimum traveling speed of the wheel 14 and the tire outer diameter D, if known, may be inputted to the control circuit 50 to calculate the longest rotation period $R_2$ and uses the longest rotation period $R_2$ to calculate and set the transmission condition value.

Also a case is assumed in which the maximum traveling speed of the vehicle 14 is known, and the tire outer diameter D of the wheel mounted to the vehicle 14 is not determined (i.e., what size of tire to be mounted is not determined). In such cases, among the tire outer diameters mountable to the vehicle 14, a tire outer diameter having a minimum value (minimum tire outer diameter) may be inputted to the control circuit 50. The control circuit 50 then uses the minimum tire outer diameter and the maximum traveling speed of the vehicle 14 to calculate the tire rotation period. The calculated period is used as the shortest rotation period $R_1$ to calculate and set the transmission condition value.

Similarly, a case is assumed in which the minimum traveling speed of the vehicle 14 is known and the outer diameter D of the tire of the wheel mounted to the vehicle 14 is not determined. In such cases, among the tire outer diameters mountable to the vehicle 14, a tire outer diameter having the maximum value (maximum tire outer diameter) is inputted to the control circuit 50. The control circuit 50 then uses the maximum tire outer diameter and the minimum traveling speed of the vehicle 14 to calculate the tire rotation period. The calculated period is used as the longest rotation period $R_2$ to calculate and set the transmission condition value.

As described thus far, the control circuit 50 calculates and sets each of the transmission condition values.

The maximum traveling speed of the vehicle 14 is the highest speed expected under the traveling conditions during acquisition of wheel information, that may generally be limited by the performance of the vehicle 14, the tire performance of the wheel 12a, and the traveling conditions. In case of the vehicle 14, as it is a truck vehicle, 90 (km/h) may be used as the maximum traveling speed, which is the maximum speed limited by a limiter for the truck vehicles. Or, if it is a passenger car in Japan, 180 (km/h) may be used as the expected highest speed.

In addition, a tire that constitutes a wheel of a vehicle, is determined a maximum speed of the vehicle to which the tire can be mounted. A code indicating the maximum speed is included in the tire application code. If the vehicle 14 is capable of traveling at a speed higher than the maximum speed of the tire, the maximum speed of the tire is used as the highest speed in the vehicle 14.

On the other hand, as the minimum traveling speed of the vehicle 14, a relatively low traveling speed may be set so as not to require sequential acquisition of wheel information during traveling. In this context, a traveling speed that does not require sequential acquisition of wheel information during traveling means a low traveling speed at which the vehicle can stop immediately, even if the air pressure of the wheel is rapidly dropped during traveling. That is, as the minimum traveling speed of the vehicle 14, a low enough speed (safe enough speed) may be set so as to prevent a situation in which the vehicle 14 continues to run for a long distance without control, even if the vehicle encounters a rapid drop in the air pressure of the wheel during traveling. For the vehicle 14, as it is a truck vehicle, 10 (km/h) may be used as the expected lowest speed, for example. In the practice of the present invention, the expected lowest speed for the vehicle is preferably set to 10 (km/h)-50 (km/h).

The transmission data thus transmitted from the transmitter 16a is then received by the receiver 18a and is supplied to the receiver body portion 20.

The MP 76 of the receiver body portion 20 refers to collation between the tire mounting position information and transmission ID which has been previously stored in the memory 78. Then the MP 76 determines (identifies), from the received transmission ID, a specific mounting position of a wheel that corresponds to the received inflation pressure data, temperature data and power supply voltage data included in the same packet as the transmission ID. The MP 76 compares the acquired inflation pressure data to a predetermined value range to determine the status of the inflation pressure. Then the signal processing circuit 79 generates and outputs a signal applicable to the display 22 based on the information of determination result. Similarly, the acquired power supply voltage data is compared with a value range previously set to determine the status of the remaining level of the battery of the transmitter 16*a*. According to the determination result, a signal applicable to the display 22 is generated and outputted.

The display 22 receives the signal outputted from the signal processing circuit 79 of the receiver body portion 20, and representing the status of each wheel (inflation pressure status and battery remaining level status) in a display mode based on the determination result, in order to inform the status of each wheel to the driver of the vehicle 14.

In the wheel information acquiring system of the present invention, the timing at which the transmitter acquires wheel information, and the transmission time width and transmission timing of the transmission data transmitted from the transmitter by wireless are controlled, in such a manner as described above. Accordingly, it is ensured to transmit the acquired wheel information such as temperature data and inflation pressure data from the transmitter, and to receive the wheel information by the receiver, while the transmitter is not positioned in the dead space.

While in the above embodiment, a truck vehicle having six wheels in total is described as an example, vehicles having at least two wheels may be included in the present invention. Also, while in the above embodiment, the wheel information includes tire inflation pressure and temperature, in the present invention, any wheel information may be included without limitation, as long as the corresponding wheel status is measured by a sensor.

EMBODIMENT

Examples of wheel information acquiring probability that can be achieved when acquiring the wheel information (tire inflation pressure data and temperature data) from a traveling vehicle by using the wheel information acquiring system described above are shown below. Tables 1 and 2 shown below include examples of acquiring probability in a case where a wheel information acquiring system A (provided with a transmitter having a repeat transmitting capability) is mounted a truck vehicle, and in a case where wheel information acquiring system B provided with a transmitter having no repeat transmitting capability is mounted to the same truck vehicle, respectively. Tables 1 and 2 below show the results obtained by driving the same truck vehicle on a public road for one week (7 days), approximately 6 hours a day. Tables 1 and 2, show the percentage of the number of times the receiver receives the wheel information to the number of times each transmitter transmits the wheel information in each case.

Table 1 shows each result of receiving probability in each receiver provided in each wheel mounting position of the vehicle body, obtained by mounting the wheel information acquiring system A to a predetermined truck vehicle (tires of front 295/80R22.5, rear 11R22.5 are used), and by mounting the wheel information acquiring system B to the same truck vehicle.

Table 2 shows each result of receiving probability in each receiver provided in each wheel mounting position of the vehicle body, obtained by mounting the wheel information acquiring system A to a predetermined bus vehicle (tires of front and rear; 12R22.5 are used), and by mounting the wheel information acquiring system B to the same bus vehicle. In Tables 1 and 2, PN corresponds to the number of repeat times as described above. FL (front left wheel), FR (front right wheel), and the like, represent wheel mounting positions of each vehicle. In Table 1 below, the results corresponding to PN=1 represent the results obtained by mounting the wheel information acquiring system B to the truck vehicle, and the results corresponding to PN=12 represent the results obtained by mounting the wheel information acquiring system A to the truck vehicle. Similarly in Table 2 below, the results corresponding to PN=1 represent the results obtained by mounting the wheel information acquiring system B to the bus vehicle, and the results corresponding to PN=2, 5, and 12 respectively represent the results obtained by mounting wheel information acquiring system A to the bus vehicle.

TABLE 1

| Tire Position | FL | FR | RLO1 | RLI1 | RRI1 | RRO1 | RLO2 | RLI2 | RRI2 | RRO2 |
|---|---|---|---|---|---|---|---|---|---|---|
| PN = 1 | 89 | 90 | 86 | 95 | 100 | 85 | 82 | 95 | 98 | 91 |
| PN = 12 | 100 | 100 | 100 | 100 | 100 | 100 | 100 | 100 | 100 | 100 |

TABLE 2

| Tire Position | FL | FR | RLO | RLI | RRI | RRO |
|---|---|---|---|---|---|---|
| PN = 1 | 95 | 92 | 85 | 90 | 91 | 88 |
| PN = 2 | 98 | 97 | 90 | 92 | 98 | 95 |
| PN = 5 | 100 | 100 | 98 | 97 | 100 | 98 |
| PN = 12 | 100 | 100 | 100 | 100 | 99 | 100 |

As shown in the tables, the wheel information receiving probability increases with the increase in the number of repeat times of packet data. In the case where the packet data is repeated twelve times, substantially 100% is achieved, which means all the wheel information can be reliably received by the receiver.

The invention claimed is:

1. A wheel information acquiring system that is attached to a wheel and acquires wheel information of the wheel during rotation, the wheel information acquiring system comprising:
    a first communication device that is attached to the wheel and detects wheel information associated with the wheel during rotation, and wirelessly transmits the detected wheel information from a wheel side; and
    a second communication device that is provided apart from the wheel and that receives and acquires the wheel information transmitted by the first communication device, wherein:

the first communication device has a maximum value of rotation speed specified for the wheel during rotation to which the first communication device is attached; and
when a transmission time width of one packet of the wheel information transmitted by the first communication device is represented by $T_1$, and an expected minimum rotation period which is determined according to the maximum value of the rotation speed prespecified in the first communication device is represented by $R_1$, the $T_1$ is set so as to satisfy $T_1 \leq R_1 \cdot \frac{1}{2}$, and wherein
the first communication device transmits, in addition to the wheel information, power supply voltage information of the first communication device.

2. The wheel information acquiring system according to claim 1, wherein the $T_1$ is set so as to satisfy $T_1 \leq R_1 \cdot \frac{1}{12}$.

3. The wheel information acquiring system according to claim 1, wherein the first communication device is attached to a wheel to be mounted to a vehicle to which a maximum traveling speed is previously set, and the maximum value of the rotation speed to be specified in the first communication device is calculated based on the maximum traveling speed of the vehicle and an outer diameter of the wheel.

4. The wheel information acquiring system according to claim 3, wherein the maximum traveling speed of the vehicle is in a range of 90 (km/h)-300 (km/h).

5. The wheel information acquiring system according to claim 3, wherein the maximum value of the rotation speed is calculated using an outer diameter of a wheel that has a smallest outer diameter among wheels to be mounted to the vehicle.

6. The wheel information acquiring system according to claim 1, wherein, the first communication device detects the wheel information at an acquiring time interval $T_2$, and repeatedly transmits the detected wheel information at each detection at a transmission interval $T_3$, and the acquiring time interval $T_2$ and the transmission interval $T_3$ are set so as to satisfy $T_3 \leq T_2 \cdot \frac{1}{10}$.

7. The wheel information acquiring system according to claim 1, wherein the first communication device detects the wheel information at an acquiring time interval $T_2$, repeatedly transmits the detected wheel information at each detection a number of repeat times PN (times), in repeating the transmission of same wheel information a number of repeat times PN (times), when a repeat transmission time width between start of first wheel information transmission and completion of PN-th wheel information transmission is represented by $T_4$, the transmission time width $T_1$, the number of repeat times PN, and the repeat transmission time width $T_4$ are set so as to satisfy $T_1 \cdot PN \leq T_4 \cdot \frac{1}{4}$.

8. The wheel information acquiring system according to claim 7, wherein the transmission time width $T_1$ and the acquiring time interval $T_2$ are set so as to satisfy $500 \cdot T_1 \leq T_2$.

9. The wheel information acquiring system according to claim 6, wherein a plurality of transmission intervals $T_3$ used in repeating the transmission of the same wheel information are respectively set to different intervals.

10. The wheel information acquiring system according to claim 7, wherein the acquiring time interval $T_2$, the transmission time width $T_1$, and the number of repeat times PN are set so as to satisfy $120 (sec) \leq T_2 \leq 660 (sec)$, $T_1 \leq 100 (msec)$, and $PN \leq 12$ (times) respectively.

11. The wheel information acquiring system according to claim 6, wherein the first communication device transmits, in addition to each packet of wheel information, count information for each group of wheel information that is detected at the acquiring interval $T_2$ to allow identification of each unit of wheel information.

12. The wheel information acquiring system according to claim 1, wherein the first communication device is attached to each of the plurality of wheels, and each of the first communication device transmits, in addition to the wheel information, wheel identification information to allow identification of a specific wheel to which each first communication device is attached.

13. A wheel information acquiring system that is attached to a wheel and acquires wheel information of the wheel during rotation, the wheel information acquiring system comprising:
a first communication device that is attached to the wheel and detects wheel information associated with the wheel during rotation, and repeatedly transmits by wireless the detected wheel information from a wheel side with repetition of a number of repeat times PN (times); and
a second communication device that is provided apart from the wheel and that receives and acquires the wheel information transmitted by the first communication device, wherein:
the first communication device has a minimum value of rotation speed specified for the wheel during rotation to which the first communication device is attached; and
when a repeat transmission time width between start of first wheel information transmission and completion of PN-th wheel information transmission is represented by $T_4$, and an expected maximum rotation period of the vehicle which is determined according to the minimum value of the rotation speed prespecified in the first communication device is represented by $R_2$, the $T_4$ is set so as to satisfy $R_2 \cdot \frac{1}{12} \leq T_4$, and wherein
the first communication device transmits, in addition to the wheel information, power supply voltage information of the first communication device.

14. The wheel information acquiring system according to claim 13, wherein the $T_4$ is set so as to satisfy $R_1 \cdot \frac{1}{2} \leq T_4$.

15. The wheel information acquiring system according to claim 13, wherein the first communication device is attached to a wheel to be mounted to a vehicle to which a minimum traveling speed is previously set, and the minimum value of the rotation speed to be specified in the first communication device is calculated based on the minimum traveling speed of the vehicle and an outer diameter of the wheel.

16. The wheel information acquiring system according to claim 15, wherein the minimum traveling speed of the vehicle is in a range of 10 (km/h)-50 (km/h).

17. The wheel information acquiring system according to claim 15, wherein the minimum value of the rotation speed is calculated using an outer diameter of a wheel that has a largest outer diameter among wheels to be mounted to the vehicle.

18. A wheel information acquiring system that is attached to a wheel and acquires wheel information of the wheel during rotation, the wheel information acquiring system comprising:
a first communication device that is attached to the wheel and detects wheel information associated with the wheel during rotation, and repeatedly transmits by wireless the detected wheel information from a wheel side with a repetition of a number of repeat times PN (times); and
a second communication device that is provided apart from the wheel and that receives and acquires the wheel information transmitted by the first communication device, wherein:
the first communication device has a maximum value and a minimum value of rotation speed specified for the wheel during rotation to which the first communication device is attached;

when a transmission time width of one packet of the wheel information transmitted by the first communication device is represented by $T_1$, and an expected minimum rotation period of the vehicle which is determined according to the maximum value of the rotation speed prespecified in the first communication device is represented by $R_1$, the $T_1$ is set so as to satisfy $T_1 \leq R_1 \cdot \frac{1}{2}$; and when a repeat transmission time width between start of first wheel information transmission and completion of PN-th wheel information transmission is represented by $T_4$, and an expected maximum rotation period of the vehicle which is determined according to the minimum value of the rotation speed prespecified in the first communication device is represented by $R_2$, the $T_4$ is set so as to satisfy $R_2 \cdot \frac{1}{12} \leq T_4$, and wherein the first communication device transmits, in addition to the wheel information, power supply voltage information of the first communication device.

19. The wheel information acquiring system according to claim 18, wherein the $T_1$ is set so as to satisfy $T_1 \leq R_1 \cdot \frac{1}{12}$.

20. The wheel information acquiring system according to claim 18, wherein the $T_4$ is set so as to satisfy $R_2 \cdot \frac{1}{2} \leq T_4$.

21. The wheel information acquiring system according to claim 18, wherein: the first communication device is attached to a wheel to be mounted to a vehicle to which a maximum traveling speed and a minimum traveling speed are previously set; the maximum value of the rotation speed to be specified in the first communication device is calculated based on the maximum traveling speed set to the wheel and an outer diameter of the wheel; and the minimum value of the rotation speed to be specified in the first communication device is calculated based on the minimum traveling speed set to the wheel and an outer diameter of the wheel.

22. The wheel information acquiring system according to claim 21, wherein the maximum traveling speed set to the vehicle is in a range of 90 (km/h)-300 (km/h) and the minimum traveling speed set to the vehicle is in a range of 10 (km/h)-50 (km/h).

23. The wheel information acquiring system according to claim 21, wherein the maximum value of the rotation speed is calculated using an outer diameter of a wheel that has a smallest outer diameter among the wheels to be mounted to the vehicle and the minimum value of the rotation speed of the wheel during rotation is calculated using an outer diameter of a wheel that has a largest outer diameter among the wheels to be mounted to the vehicle.

24. A wheel information acquiring system that is attached to a wheel and acquires wheel information of the wheel during rotation, the wheel information acquiring system comprising:

a first communication device that is attached to the wheel and detects wheel information associated with the wheel during rotation, and wirelessly transmits the detected wheel information from a wheel side; and a second communication device that is provided apart from the wheel and that receives and acquires the wheel information transmitted by the first communication device, wherein:

the first communication device has a maximum value of rotation speed specified for the wheel during rotation to which the first communication device is attached; and when a transmission time width of one packet of the wheel information transmitted by the first communication device is represented by $T_1$, and an expected minimum rotation period which is determined according to the maximum value of the rotation speed prespecified in the first communication device is represented by $R_1$, the $T_1$ is set so as to satisfy $T_1 \leq R_1 \cdot \frac{1}{2}$, and wherein the first communication device detects the wheel information at an acquiring time interval $T_2$, repeatedly transmits the detected wheel information at each detection a number of repeat times PN (times), in repeating the transmission of same wheel information a number of repeat times PN (times), when a repeat transmission time width between start of first wheel information transmission and completion of PN-th wheel information transmission is represented by $T_4$, the transmission time width $T_1$, the number of repeat times PN, and the repeat transmission time width $T_1$ are set so as to satisfy $T_1 \cdot PN \leq T_4 \cdot \frac{1}{4}$.

25. A wheel information acquiring system that is attached to a wheel and acquires wheel information of the wheel during rotation, the wheel information acquiring system comprising:

a first communication device that is attached to the wheel and detects wheel information associated with the wheel during rotation, and repeatedly transmits by wireless the detected wheel information from a wheel side with a repetition of a number of repeat times PN (times); and a second communication device that is provided apart from the wheel and that receives and acquires the wheel information transmitted by the first communication device, wherein:

the first communication device has a maximum value and a minimum value of rotation speed specified for the wheel during rotation to which the first communication device is attached;

when a transmission time width of one packet of the wheel information transmitted by the first communication device is represented by $T_1$, and an expected minimum rotation period of the vehicle which is determined according to the maximum value of the rotation speed prespecified in the first communication device is represented by $R_1$, the $T_1$ is set so as to satisfy $T_1 \leq R_1 \cdot \frac{1}{2}$; and when a repeat transmission time width between start of first wheel information transmission and completion of PN-th wheel information transmission is represented by $T_4$, and an expected maximum rotation period of the vehicle which is determined according to the minimum value of the rotation speed prespecified in the first communication device is represented by $R_2$, the $T_4$ is set so as to satisfy $R_2 \cdot \frac{1}{12} \leq T_4$, and wherein the first communication device detects the wheel information at an acquiring time interval $T_2$, repeatedly transmits the detected wheel information at each detection a number of repeat times PN (times), in repeating the transmission of same wheel information a number of repeat times PN (times), when a repeat transmission time width between start of first wheel information transmission and completion of PN-th wheel information transmission is represented by $T_4$, the transmission time width $T_1$, the number of repeat times PN, and the repeat transmission time width $T_4$ are set so as to satisfy $T_1 \cdot PN \leq T_4 \cdot \frac{1}{4}$.

* * * * *

UNITED STATES PATENT AND TRADEMARK OFFICE
CERTIFICATE OF CORRECTION

PATENT NO. : 7,817,023 B2
APPLICATION NO. : 11/720178
DATED : October 19, 2010
INVENTOR(S) : Kazuhiro Shimura It is certified that error appears in the above-identified patent and that said Letters Patent is hereby corrected as shown below:

At column 6, line 22, after "$T_1 \leqq R_1 \cdot 1/2$" insert --.--.

At column 15, line 56, after "value" insert --.--.

At column 19, lines 38-49, please delete

"7. The wheel information acquiring system according to claim 1, wherein the first communication device detects the wheel information at an acquiring time interval $T_2$, repeatedly transmits the detected wheel information at each detection a number of repeat times PN (times), in repeating the transmission of same wheel information a number of repeat times PN (times), when a repeat transmission time width between start of first wheel information transmission and completion of PN-th wheel information transmission is represented by $T_4$, the transmission time width $T_1$, the number of repeat times PN, and the repeat transmission time width $T_4$ are set so as to satisfy $T_1 \cdot PN \leqq T_4 \cdot 1/4$.", and insert therefore --7. The wheel information acquiring system according to claim 1, wherein the first communication device detects the wheel information at an acquiring time interval $T_2$, repeatedly transmits the detected wheel information at each detection a number of repeat times PN (times), in repeating the transmission of same wheel information a number of repeat times PN (times), when a repeat transmission time width between start of first wheel information transmission and completion of PN-th wheel information transmission is represented by $T_4$, the transmission time width $T_1$, the number of repeat times PN, and the repeat transmission time width $T_4$ are set so as to satisfy $T_1 \cdot PN \leqq T_4 \cdot 1/4$.--.

Signed and Sealed this
Ninth Day of August, 2011

David J. Kappos
*Director of the United States Patent and Trademark Office*